Nov. 29, 1949 E. A. HALL 2,489,772
POWER DRILL ATTACHMENT FOR CHAIN SAWS
Filed Nov. 1, 1947
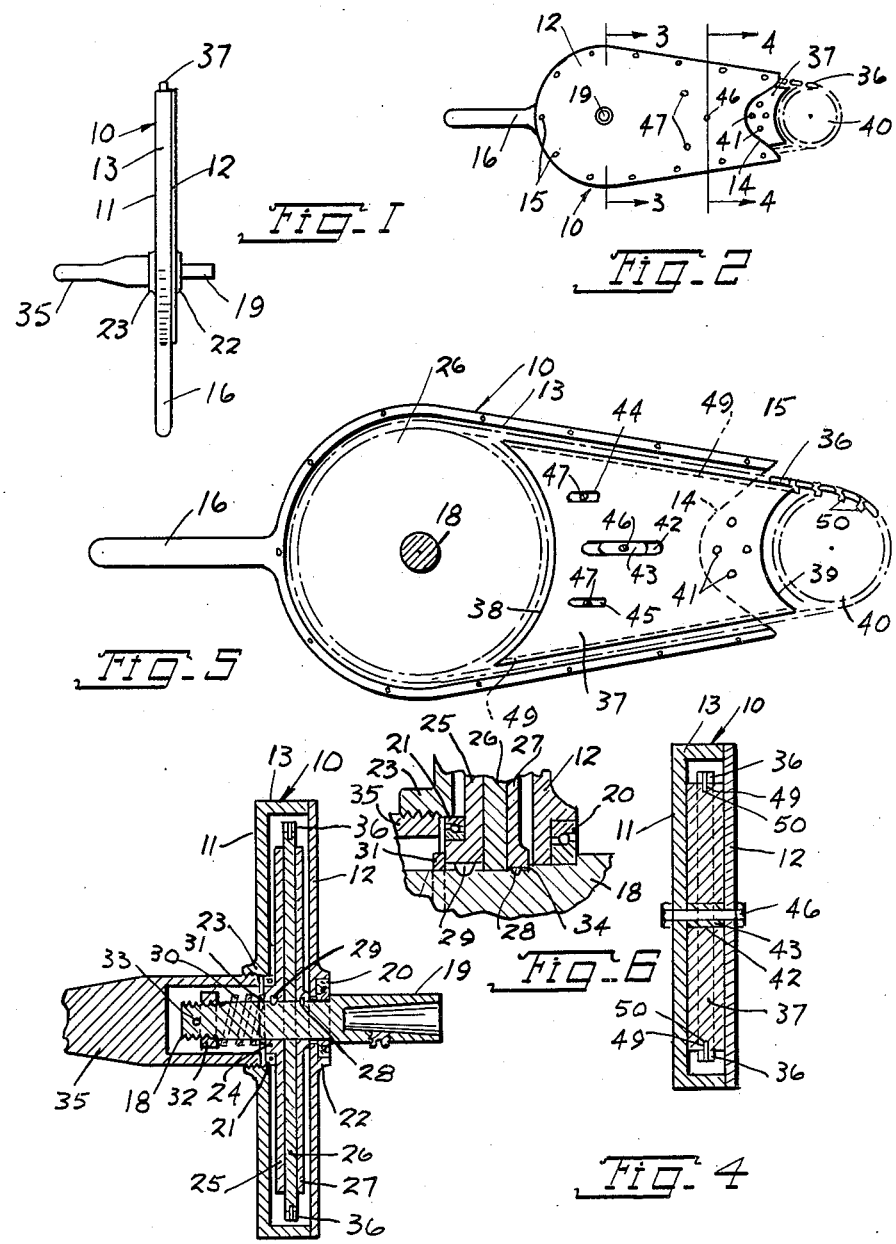
INVENTOR.
EUGENE A. HALL
BY
ATTORNEY.

Patented Nov. 29, 1949

2,489,772

UNITED STATES PATENT OFFICE 2,489,772

POWER DRILL ATTACHMENT FOR CHAIN SAWS

Eugene A. Hall, Chilliwack, British Columbia, Canada

Application November 1, 1947, Serial No. 783,519

4 Claims. (Cl. 143—157)

This invention relates to new and useful improvements in power augers and drills, and has more particular reference to a power auger attachment for chain saws.

The invention particularly proposes an especially simple attachment which is adapted to be connected with a chain saw gear housing, and the chain with its teeth removed of the chain saw for supplying the necessary power to drive the auger or drill.

It is proposed to provide the new power auger attachment with a chuck which may be variable to take augers of various sizes, steel drills and other types of twist tools.

The invention proposes to so construct the new power auger attachment that it may be used in combination with practically any of the chain saw motors now on the market by merely requiring a change of sprocket wheel to fit the chain saw sprocket pitch. It is also proposed to so construct other portions of the attachment to fit or accommodate various chains of chain saws from which the saw teeth have preferably been removed.

It is proposed that the new power auger attachment be provided with a safety slip clutch the tension of which may be adjusted with a suitable spring and adjustment nut so that if the auger jams, the clutch will slip and it will not damage the attachment or injure the operators.

It is another object of this invention to provide the power auger attachment with suitable handles so that it may be conveniently held by two operators, one on the auger side and one on the handle of the motor. When thus supported the auger may be operated in any direction or angle.

Another important object of this invention is to construct the new auger attachment especially simple and to provide it with a suitable sub-frame, or support frame, upon which the saw gear housing of a chain saw may be readily bolted. It is also proposed that the sub-frame, or support frame, be arranged so as to guide the chain of the attachment.

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a plan view of a power driven auger attachment for chain saws constructed in accordance with this invention.

Fig. 2 is a side view of Fig. 1 looking from the right hand side.

Fig. 3 is a fragmentary enlarged vertical sectional view taken on the line 3—3 of Fig. 2.

Fig. 4 is an enlarged vertical sectional view taken on the line 4—4 of Fig. 2.

Fig. 5 is an enlarged elevational view similar to Fig. 2 but illustrated with the front cover and certain other parts removed.

Fig. 6 is a fragmentary enlarged view of Fig. 3.

The new and improved power auger attachment for chain saws, in accordance with this invention, includes a flat housing 10 having a back wall 11, a front wall 12, and a surrounding wall 13 between said front and back walls. This surrounding wall 13 has an open end 14. The housing 10 is substantially of pear shape when viewed in side elevation, as illustrated in Figs. 2 and 5. The front wall 12 is in the nature of a removable front cover which is held in position by a plurality of fastening elements 15 along its edges. These fastening elements 15 may comprise cap screws or the like engaging the edges of the surrounding wall 13. The housing 10 is provided with a handle 16 at the end remote from the open end 14 thereof.

A shaft 18 is rotatively mounted through the housing 10 and projects from said back wall 11 and front wall 12. The front end of the shaft 18 is provided with a chuck 19 adapted to receive the shanks of various sizes of wood augers, twist drills of various designs, steel drills, and other tools. The shaft 18 is rotatively supported by ball bearings 20 and 21. The ball bearing 20 is mounted within a boss 22 formed on the outer face of the front wall 12. The ball bearing 21 is mounted within a tubular portion 23 formed upon the back wall 11. The ball bearing 21 does not support the shaft 18 directly, but supports it indirectly by reason of directly supporting the hub 24 of a friction disc 25. The friction disc 25 is mounted upon the shaft 18.

A sprocket wheel 26 is freely rotatively mounted on the shaft 18 and is located within the housing 10 between the back wall 11 and front wall 12. The sprocket wheel 26 is associated with a slip clutch which comprises said friction disc 25, and another friction disc 27 which is also mounted upon the shaft 18 but to the other side of the sprocket wheel 26. The friction disc 27 is fixedly attached to the shaft 18 by a key 28 and by engaging against a shoulder 34 formed on the shaft 18. The friction disc 25 is non-rotatively but slidably mounted upon the shaft 18 by a key 29.

Adjustable spring means is associated with the friction clutch by which the frictional resistance of the clutch may be varied. Said adjustable spring means includes a spring 30 mounted upon the shaft 18 and engaging against a washer 31 which bears against the hub 24 of the friction disc 25. An adjustment nut 32 is threadedly engaged upon the shaft 18 and is fixedly located in a selected adjusted position by a pin 33 and controls the tension of the spring 30. The spring 30 urges said non-rotative slidable friction disc 25 against said sprocket wheel 26 which is then being forced against the other friction disc 27 which is fixedly mounted on the shaft 18. With this arrangement rotations from the sprocket wheel 26 will be transmitted to the friction discs 25 and 27 which in turn will drive the shaft 18 and chuck 19.

A hollow handle 35 engages over the end of the shaft 18 remote from the chuck 19 and houses and encases the adjustable spring means which is characterized by the spring 30 and adjustment nut 32. A chain 36 engages over said sprocket 26 and extends out of the open end 14 of the housing 10. A support frame and chain guide 37 is adjustably mounted within said housing 10 and projects from said open end 14 for supporting a chain saw motor with its sprocket in end alignment with said support frame 37 for engaging said chain 36. More specifically, the support frame 37 is in the form of a thick flat plate. Its inner end 38 is curved and slightly spaced from the side of the sprocket wheel 26. Its outer end 39 is also curved and adapted to be slightly spaced from a sprocket wheel schematically illustrated on the drawing by the dot and dash lines 40, said sprocket wheel 40 being the sprocket wheel of the chain saw.

The projecting end portion of the support frame 37 is formed with a plurality of openings 41 for bolts by which the saw gear housing of the chain saw may be bolted. The support frame 37 is adjustably supported. It is formed with a large central slot 42 into which an elongated lug 43 from the back wall 11 projects. The support frame 37 is also provided with a pair of slots 44 and 45 above and below the slot 42. The slots 42, 44, and 45 are parallel to each other. A bolt 46 passes through the back wall 11, the lug 43, and the front wall 12. Bolts 47 pass through the back wall 11, the slots 44 and 45, and the front wall 12. The bolts 46 and 47 assist in clamping the support frame 37 between the front wall or cover plate 12, and the back wall 11 for fixedly holding the support frame 37 in position. The cap screws 15 also assist in clamping the cover plate 12 against the support frame 37. The top and bottom edge portions of the support frame 37 are formed with grooves 49 through which the drive lugs 50 of the chain 36 pass.

The operation and use of the new and improved power auger attachment for chain saws may be understood from the following:

When a saw gear housing is mounted upon the projecting end of the support frame 37 by engaging bolts through the openings 41 of the frame 37, the sprocket (indicated by the dot and dash lines 40) of the chain saw will be in edge alignment with the support frame 37. The chain 36 is engaged around the sprocket 40. The cap screws 15 and the bolts 46 and 47 are loosened and the support frame 37 is extended outwards a suitable amount so as to suitably extend the chain 36 to be in taut driving condition.

An auger or other drill or tool may now be mounted in the chuck 19. The power auger attachment may be conveniently supported by two men, one supporting it by the handles 16 and 35, and the other supporting it by holding the housing of the saw gear housing which is mounted on the projecting end of the support frame 37. The saw gear motor may now be operated for driving the sprocket 40 which through the medium of the chain 36 drives the sprocket wheel 26. Rotations from the sprocket 26 will be transmitted by the friction discs 25 and 27 to drive the shaft 18 and so indirectly drive the auger, or other drill, or tool mounted in the chuck 19.

If for any reason the auger jams so that the driven shaft 18 is arrested from turning, no damage will be done to the attachment or the operators because in such an event the sprocket wheel 26 continues rotating but the rotations will not be transmitted by the discs 25 and 27 to the shaft 18. The sprocket 26 will merely slip between the discs without driving them. The tension of the spring 30 determines the amount of power which will be transmitted by the slip clutch, and when this amount is exceeded then the slipping just referred to takes place.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A power auger attachment for chain saws, comprising a flat housing having a back wall and a front wall and a surrounding wall between said walls and open at one end, a shaft rotatively mounted through said housing and projecting from said back and front walls, a sprocket wheel freely mounted on said shaft and located in said housing between said back and front walls, a pair of slip clutch discs mounted on said shaft to the sides of said sprocket wheel one of said discs being fixed on said shaft and the other being non-rotatively slidably mounted thereon, adjustable spring means mounted on said shaft and urging said non-rotatively slidable disc against said sprocket wheel which is then being forced against said other disc, a chuck for an auger or drill on one end of said shaft, a hollow handle engaging over the other end of said shaft and mounted on said housing and encasing said adjustable spring means, a chain engaging over said sprocket wheel and extending out of the open end of said housing, and a support frame and chain guide adjustably mounted within said housing and projecting from said open end for supporting a chain saw motor with its sprocket in end alignment with said support frame and engaging said chain.

2. A power auger attachment for chain saws, comprising a flat housing having a back wall and a front wall and a surrounding wall between said walls and open at one end, a shaft rotatively mounted through said housing and projecting from said back and front walls, a sprocket wheel freely mounted on said shaft and located in said housing between said back and front walls, a pair of slip clutch discs mounted on said shaft to the sides of said sprocket wheel one of said discs being fixed on said shaft and the other being non-rotatively slidably mounted thereon, adjustable spring means mounted on said shaft and urging said non-rotatively slidable disc against said sprocket wheel which is then being forced against said other disc, a chuck for an auger or drill on one end of said shaft, a hollow handle engaging over the other end of said shaft and mounted on said housing end encasing said adjustable spring means, a chain engaging over said sprocket wheel and extending out of the open end of said housing, and a support frame and chain guide adjustably mounted within said housing and projecting from said open end for supporting a chain saw motor with its sprocket in end alignment with said support frame and engaging said chain, the front wall of said flat housing being in the nature of a cover plate removably mounted upon said surrounding wall, and said cover plate being clamped against said support frame for assisting in holding said frame in adjusted positions.

3. A power auger attachment for chain saws, comprising a flat housing having a back wall and a front wall and a surrounding wall between said walls and open at one end, a shaft rotatively mounted through said housing and projecting from said back and front walls, a sprocket wheel freely mounted on said shaft and located in said housing between said back and front walls, a pair of slip clutch discs mounted on said shaft to the sides of said sprocket wheel one of said discs being fixed on said shaft and the other being non-rotatively slidably mounted thereon, adjustable spring means mounted on said shaft and urging said non-rotatively slidable disc against said sprocket wheel which is then being forced against said other disc, a chuck for an auger or drill on one end of said shaft, a hollow handle engaging over the other end of said shaft and mounted on said housing end encasing said adjustable spring means, a chain engaging over said sprocket wheel and extending out of the open end of said housing, and a support frame and chain guide adjustably mounted within said housing and projecting from said open end for supporting a chain saw motor with its sprocket in end alignment with said support frame and engaging said chain, said support frame having parallel slots, a lug from said rear wall engaging through one of said slots, and bolts engaging through said lug and said slots and mounted through the back and front walls of said housing for assisting in adjustably supporting said support frame.

4. A power auger attachment for chain saws, comprising a flat housing having a back wall and a front wall and a surrounding wall between said walls and open at one end, a shaft rotatively mounted through said housing and projecting from said back and front walls, a sprocket wheel freely mounted on said shaft and located in said housing between said back and front walls, a pair of slip clutch discs mounted on said shaft to the sides of said sprocket wheel one of said discs being fixed on said shaft and the other being non-rotatively slidably mounted thereon, adjustable spring means mounted on said shaft and urging said non-rotatively slidable disc against said sprocket wheel which is then being forced against said other disc, a chuck for an auger or drill on one end of said shaft, a hollow handle engaging over the other end of said shaft and mounted on said housing and encasing said adjustable spring means, a chain engaging over said sprocket wheel and extending out of the open end of said housing, and a support frame and chain guide adjustably mounted within said housing and projecting from said open end for supporting a chain saw motor with its sprocket in end alignment with said support frame and engaging said chain, said flat housing being of pear shape in side elevation, said support frame having its top and bottom sides grooved and spaced from the top and bottom portions of the surrounding wall of said housing, said chain engaging through the spaces between said support frame and surrounding wall and bearing against the top and bottom edge portions of said support frame, and said chain having lugs engaging through said grooves.

EUGENE A. HALL.

REFERENCES CITED

The following references are of record in the file of this patent:

UNITED STATES PATENTS

| Number | Name | Date |
|---|---|---|
| 613,748 | Wilson | Nov. 8, 1898 |
| 754,753 | D'Isepo | Mar. 15, 1904 |
| 1,530,886 | Gora | Mar. 24, 1925 |
| 2,326,854 | Hassler | Aug. 17, 1943 |